(12) United States Patent
Jordan (10) Patent No.: US 9,723,773 B2
(45) Date of Patent: Aug. 8, 2017

(54) SOIL TILLAGE APPARATUS AND METHOD

(71) Applicant: Ben Jordan, Cedar City, UT (US)

(72) Inventor: Ben Jordan, Cedar City, UT (US)

( * ) Notice: Subject to any disclaimer, the term of this patent is extended or adjusted under 35 U.S.C. 154(b) by 0 days.

(21) Appl. No.: 14/879,360

(22) Filed: Oct. 9, 2015

(65) Prior Publication Data

US 2016/0100516 A1  Apr. 14, 2016

Related U.S. Application Data

(60) Provisional application No. 62/062,049, filed on Oct. 9, 2014.

(51) Int. Cl.
A01B 49/02 (2006.01)

(52) U.S. Cl.
CPC ........... *A01B 49/022* (2013.01); *Y02P 60/144* (2015.11)

(58) Field of Classification Search
CPC ..... A01B 29/048; A01B 17/00; A01B 49/027; A01B 49/02; A01B 49/022; A01B 33/024; A01B 31/00; A01B 35/16; A01B 61/046; A01B 63/32; A01B 51/04; A01B 79/00; Y02P 60/144
USPC ....... 172/176, 177, 133, 107, 112, 146, 166, 172/175, 509, 701
See application file for complete search history.

(56) References Cited

U.S. PATENT DOCUMENTS

| | | | | |
|---|---|---|---|---|
| 3,029,879 A * | 4/1962 | Wells, Jr. | ............. | A01B 33/021 172/112 |
| 4,213,408 A * | 7/1980 | West | ........................ | A01C 5/06 111/137 |
| 4,508,177 A * | 4/1985 | Wiser | ..................... | A01B 13/16 172/177 |
| 4,624,197 A * | 11/1986 | Drake | .................... | A01B 51/04 111/162 |
| 5,261,171 A * | 11/1993 | Bishop | .................... | B07B 1/005 209/257 |
| 5,524,711 A * | 6/1996 | Harris | ..................... | A01B 33/16 172/112 |
| 5,590,721 A * | 1/1997 | Van Mill | .............. | A01B 49/027 172/138 |
| 6,431,287 B1 * | 8/2002 | Ramp | .................. | A01B 33/024 172/107 |
| 6,554,078 B1 * | 4/2003 | McDonald | ........... | A01B 49/027 172/146 |
| 6,698,525 B2 * | 3/2004 | McFarlane | ........... | A01B 49/027 172/145 |
| 8,887,824 B1 * | 11/2014 | Johnson | ............... | A01B 49/027 172/146 |
| 9,363,938 B1 * | 6/2016 | Slagel | ..................... | A01B 63/32 |

(Continued)

*Primary Examiner* — Robert Pezzuto (74) *Attorney, Agent, or Firm* — M. Reid Russell (57) ABSTRACT

A soil tillage apparatus that includes a frame with a hitch arrangement for pulling the frame mounting, back from the frame front end, are sequently mounted earth cutter disks that individually turn when pulled through the soil to lift the soil above the ground, followed by a hammer tiller consisting of a rotor drum mounted to turn oppositely to the cutter disks and includes pivotally mounted tines that turn with the rotor drum above the ground to flail the clumps of soil lifted by the disks and pulverize the clumps of lifted soil, in mid-air, into soil particles that fall back to the ground, and are mixed into the soil by chiselers that follow the hammer tiller, and the frame may further mount a soil leveler wheel and soil packer wheel.

9 Claims, 7 Drawing Sheets

(56) References Cited

U.S. PATENT DOCUMENTS

2004/0144550 A1* 7/2004 Hurtis .................. A01B 49/027
172/147
2007/0089888 A1* 4/2007 Condrey ................ A01B 17/00
172/690

* cited by examiner

SOIL TILLAGE APPARATUS AND METHOD

CROSS-REFERENCE TO RELATED APPLICATIONS

This application claims the benefit of U.S. Provisional Application Ser. No. 62/062,049, filed on Oct. 9, 2014, which is incorporated herein by reference.

TECHNICAL FIELD

The present disclosure relates to machines and systems for agriculture. More specifically, the present disclosure is related to machinery used for tilling and planting.

BACKGROUND

In the farming and agriculture industries, a variety of apparatuses are used to prepare the soil, such as harrows and plows. Harrows and plows may incorporate discs, chisels, or other components. One common method to till the soil uses discs and is known as disking. However, disking is very inefficient as it typically requires multiple passes to get the proper depth and tillage. This results in excessive wear and tear, fuel, hours on tractors and equipment, and soil compaction due to multiple passes with the equipment. Often, fields with large quantities of crop residue require a pass with a mowing or shredding device prior to disking. Rototillers dig up the soil, but are very slow and high maintenance as a result—especially for heavily compacted soil. Chisel-type sub-soilers and sweeps fracture ground well, but leave a very rough surface. There is also a lot of top soil and organic matter in the way, which requires more horsepower to drag through it.

The typical disc has two sets of gangs, one behind another. The rear discs aren't as efficient because they must disc (cut) through matter that the front discs throw back. This means that the same soil is often maneuvered twice: once by the front discs and once by the rear discs. This also means that the rear discs cannot reach the depths needed. In order to ensure proper disking, the operator of the tractor will generally ensure that its speed does not exceed around 7 miles per hour—any faster and the discs throw dirt and soil, which can create furrows. The more discs in the system, the greater the horsepower required to turn the discs.

Rototillers make soil ready for planting by making it fine and level. However, standard rototillers till unnecessarily deep, which not only buries organic matter, but takes excessive horsepower and fuel. Burying organic matter creates rot and carbon dioxide, which creates soil imbalances and kills microorganisms. Rototillers also move very slowly, which creates significant and unwarranted wear on the tiller.

As such, there remains a need for equipment that can prepare the soil more efficiently, thereby using less fuel and creating a more nutrient rich soil. The present invention solves these and other problems.

SUMMARY OF EXAMPLE EMBODIMENTS

In one embodiment, a soil tillage apparatus comprises a frame having an earth cutter, a hammer tiller, chiselers, a soil leveler, and a packer wheel all in a linear arrangement. The earth cutter comprises a plurality of discs and is positioned at the front of the frame, proximal to a tractor, truck, or other pulling means. The hammer tiller is positioned behind the earth cutter and comprises a rotary drum having one or more pulverizes attached thereto for pulverizing soil received from the earth cutter. The chiselers are positioned next and dig deep into the soil that is not passed above by the hammer tiller. The soil leveler comprises a rotary drum with a plurality of protrusions for leveling the soil. The packer wheel likewise comprises a rotary drum with a plurality of protrusions which may be used for leveling purposes or for seed bed furrowing, depending upon the arrangement.

In another embodiment, a soil tillage apparatus comprises a frame having an earth cutter, a hammer tiller, and chiselers.

In yet another embodiment, a soil tillage apparatus comprises a frame having an earth cutter, a plurality of hammer tillers, and chiselers.

DETAILED DESCRIPTION OF EXAMPLE EMBODIMENTS

The following descriptions depict only example embodiments and are not to be considered limiting of its scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to any included drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various different sequences and arrangements while still falling within the scope of the present invention.

Figure 1:
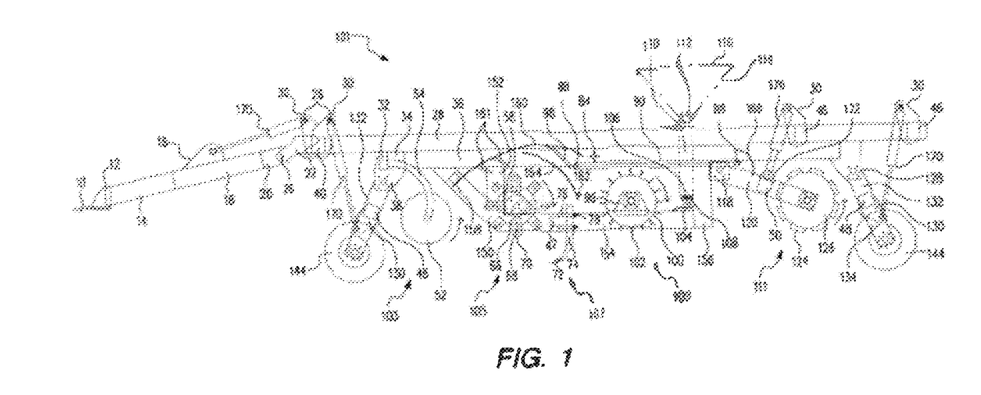
FIG. 1 is a side elevation view of a soil tillage apparatus.
Figure 2:
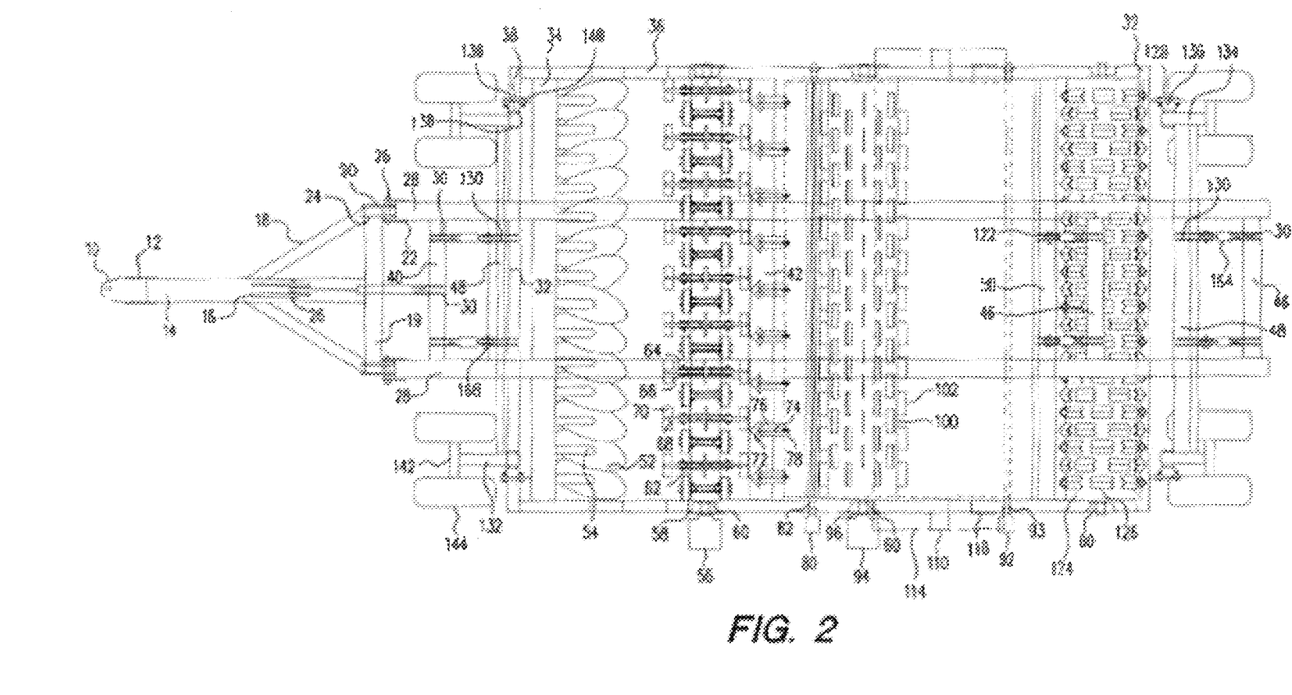
FIG. 2 is a top plan view of a soil tillage apparatus.

Referring first to the soil tillage apparatus 101 shown generally in FIGS. 1 and 2, the hitch point 10 is for connecting to a pulling source (such as a tractor, truck, or other similar), which is attached to the main tongue member 14 with the assistance of the connecting support plates 12 for added support. The main tongue member 14 is reinforced by the tongue support members 18 as well as tongue cross member 19 which gives the main tongue member 14 structure and strength. The tongue components 14,18,19 are then attached to main frame 28 through pivoting connecting members 20 and 22 by a connecting pin or bearing mechanism 26.

The main frame 28 comprises a front cross-member 40 and a rear cross-member 46. A sub-frame 36 is connected to, and positioned below, the main frame 28 and comprises front cross-member 32, and front mounting member 34. A carriage-frame 154 is connected to, and positioned below, the sub-frame 36 and comprises front angle member 150, lower frame mounting member 42, carriage support member 152, and the carriage rear vertical member 156.

The tongue-to-machine height ratio is set by an adjustable mechanism 170 such as a hydraulic ram or other mechanisms for the purpose of setting tillage depth and other functional options. The adjustable mechanism 170 is connected on one end to main tongue member 14 by the means of connecting plates 16 and connecting pin 26 and on the other end to main frame 40 by the means of connecting plates 30 and connecting pin 26.

The soil tillage apparatus 101 has a front and rear adjustable-height assembly, which allows for adjustability of the soil tillage apparatus 101 for over-the-road travel from field-to-field, as well as various working depths and angles in the field. The front adjustable height assembly is attached to the sub-frame cross-member 32 by the means of connecting plate 38 and pivot mechanism/bearing 136 which is connected through pivot pin/shaft assembly 138 to front side members 132. The front side members 132 have wheels 144 and axle members 142 attached to the lower end. Between the two front side members 132 there is a cross-member 48 that connects the opposite sides together. The adjustable-height assembly is raised and lowered by an adjustable mechanism 170 (e.g., hydraulic piston) which is attached on upper end to main frame front member 40 by connecting plates 30 and connecting pin 26 and on the other end is attached to cross member 48 by the means of connecting plates 130 and connecting pins 26.

The rear adjustable-height assembly is attached to the sub-frame rear cross-member 32 by the means of connecting plate 128 and pivot mechanism/bearing 136 which is connected through pivot pin/shaft assembly 138 to rear side members 132. The rear side members 132 have wheels 144 and axle members 142 attached to lower end. Between the two rear side members 132 there is a cross-member 48 that connects the opposite sides together. The adjustable-height assembly is raised and lowered by an adjustable mechanism 170 which is attached on an upper end to main frame rear cross-member 46 by connecting plates 30 and connecting pin 26 and on the other end is attached to cross-member 48 by the means of connecting plates 130 and connecting pins 26.

Positioned behind the front adjustable height-assembly is the earth cutter 103, which may be comprised of a plurality of discs 52 or similar devices. The earth cutter 103 is attached utilizing connecting arm member 54 to sub-frame front cross-member 34. The earth cutter 103 slices and feeds topsoil up into a hammer tiller 105 (more fully detailed below and detailed views shown in FIGS. 8-9). In one embodiment, the hammer tiller 105 is positioned at a height above that of the earth cutter 103 and, therefore, above the ground. Although the hammer tiller 105 is not required to be at a height greater than the earth cutter 103, best results are achieved with such an arrangement. The hammer tiller 105 then pulverizes the topsoil/organic matter and passes it over the top of lower carriage mounting member 42. In other words, the hammer tiller 105 pulverizes soil in mid-air as it is thrown upwards from the earth cutter 103. This unique feature (mid-air pulverization) allows for easier pulverization, which not only creates less wear on the equipment, but requires less horsepower—which thereby saves on fuel and money.

Figure 3A:
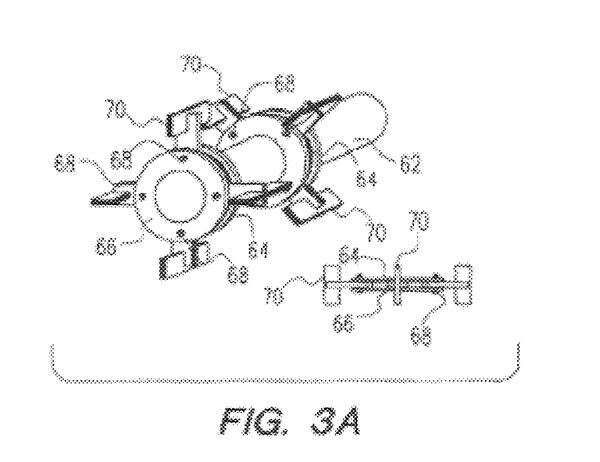
FIG. 3A is a detailed perspective view of a hammer tiller of a soil tillage apparatus.
Figure 3B:
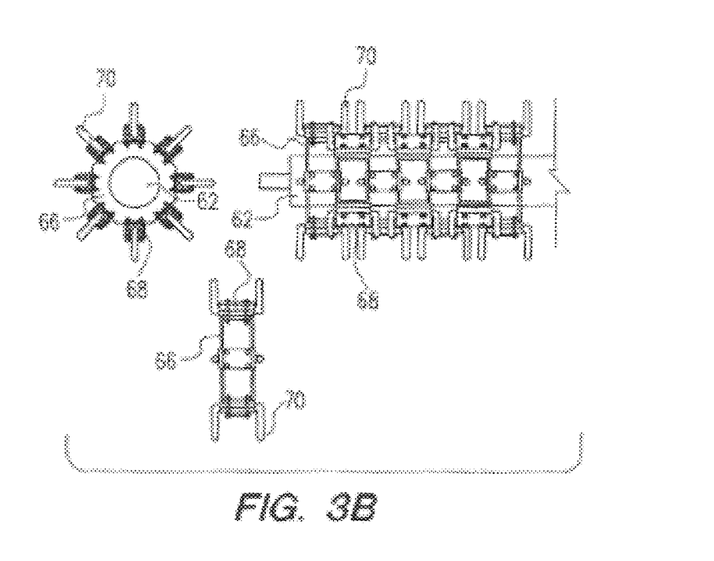
FIG. 3B is a detailed perspective view of another embodiment of a hammer tiller of a soil tillage apparatus.

In one embodiment, a hammer tiller 105 comprises a drive mechanism 56 (hydraulic motor or other system) which rotates the rotor drum shaft 62 which turns on bearings 60 that are located on both ends and are held by brackets 58. As best seen in FIGS. 3A and 3B, the rotor drum shaft 62 houses ring plate members 66 which are designed to contain hammer tine holding mechanism 68 which holds hammer tines/blades 70 or other type of earth pulverizing/cutting members that are either free swinging or solid mounted. As illustrated in FIGS. 3A and 3B, the hammer tines/blades 70 may vary in shape and size without departing from the present invention. Because the hammer tiller has its own drive mechanism 56, it can vary in speed according to the need of the user. There may be also be a shield 160 that is held in place by shield holding member 158, that covers over the top/around the hammer tiller 105 for the purpose of containing flying soil/organic matter. Further, there may also be optional impact members 161 that can be added to the shield 160. This allows for soil material to be pulverized more upon hitting impact members 161 and returning back into the hammer tiller 105 repetitively. In other words, as the soil tillage apparatus is used, the earth cutter 103 cuts the earth, sending soil towards the hammer tiller 105. Top soil and pulverized earth will pass over the hammer tiller 105 as it rotates opposite the direction of the movement of the soil tillage apparatus. Larger clods of dirt will be pulverized and either pass over the top or will be pulverized by the chisel-type assembly, as described next.

Because the upper soil surface can be made finer utilizing the hammer tiller 105 to pulverize, it allows the lower tillage area to be loosened/fractured by using simple chisel-type soil fracturing/ripping tools that do less microbial damage to the soil and use less fuel and horsepower. With most of the soil/organic matter (debris/forage) passing over the top of lower carriage tillage area (i.e., chiselers 107), there are significantly fewer problems with debris build-up on tillage mechanisms. It allows for lower tillage depths without re-handling the upper soil layer. Therefore, organic crop residue and topsoil will remain on top of the tilled earth, instead of being buried unnecessarily deep, which can create unwanted $CO_2$ gas. Further, because the topsoil travels through the air and over the next tillage set (chiselers 107), it creates a relatively debris free, lower depth tilling option for tillage tools such as chisel-type sub-soiling, sweeps, discs, rippers, and/or other tillage systems.

The chisel-type tillage system (also referred to as "chiselers") 107 that connects to the lower carriage mounting member 42 illustrated throughout the figures is just one example of many types of tillage systems that are designed to be utilized behind the hammer tiller 105. The chisel-type tillage system 107 that is illustrated mounts to the lower carriage mounting member 42 with tool mounting brackets 76 that clamp and adjust using the adjusting mechanism 78 which holds the shank arm 74 having a chisel-type tillage tip 72.

Referring back to upper soil flow coming from the hammer tiller 015, it allows for particle separation where the heavier, and larger, particles drop to the ground before the smaller, and lighter, particles flow above and eventually drop on top of the earth—thus leaving a finer mulch-type covering material for a superior seed bed. In one embodiment, along with the extended versions (FIGS. 1-2 and 8-9) of the soil tillage apparatus, there is an option wherein when the soil is in midair, a percentage of the soil can be divided and routed by an adjustable shield guide divider 164 to a soil separation mechanism 98 that allows only finer type soil to flow onto a conveyor belt 90 held by end rollers 88 and driven by a drive mechanism 92. The hammer tiller 105 will also break-up rocks and, overtime, help reduce the amount of rocks in the field. The hammer tiller 105 allows for rototiller consistency of the soil with less horse power and equipment wear.

While on the conveyor belt(s) 90, or other soil transfer mechanisms, the soil is set to a precise thickness/quantity by a leveling mechanism 84 (rotary or other type). The conveyor belt(s) 90 then feeds soil over and past the rotary soil leveler 109, and/or other types of soil handling systems, and the seed planting mechanism in a metered quantity. As the soil comes off the end of the conveyor belt(s) 90, there is a soil shield guide member 166 that helps guide the soil downward to spread soil at as a precise depth over the seeds (soil metering system). This is an optional embodiment of creating a seed planting system wherein the seed is covered by a precisely metered amount of soil that is taken from in front of the seed placement and fed onto the seed after it is laid on the soil. Primarily utilizing soil flow created by the hammer tiller 105 as a source of soil to create single pass tillage and planting system combined into one.

The upper soil layer coming from the action of the hammer tiller 105 that is not fed to the conveyor belt 90 for seed planting is guided back to the ground by the shield guide divider 164 which is adjustable from the pivot mechanism 162. After the upper soil is returned back on top of handled lower soil levels, behind the lower level tillage assembly (i.e., chiselers) 107, the soil is available to be further handled by a variety of other soil handling mechanisms such as a rotary leveler, planting, and coulter packing systems.

Both the soil that is guided to the ground in front of a rotary leveler 109, as well as the soil that is prepared by the lower level tillage assembly, are leveled at the same time by the rotary leveler 109. The rotary leveler 109 comprises a drive mechanism 94 (hydraulic motor or other) that rotates the rotary leveler drum shaft 100 which turns on bearings 60 that are located on both ends and are held by brackets 96. The rotary leveler 109 has blade like members (protrusions) 102 that work the surface of the ground for the purpose of making a smooth/level surface, or a contour forming mechanism for making a seed bed furrow ground layout typical for planting vegetable and planting row crop type systems.

In one embodiment, the seed planting system is located after the rotary leveler 109, to place seed upon a smooth/level or contoured soil surface in preparation to be covered with soil from the soil metering system. There is a holding bracket 104 for the seed planting system to which the seed planter 106 is connected. The seed planters are supplied equally by seed distribution augers 108 which are fed by seed feed shoots 110 which can be located on both sides that connect to seed bin 114 which has feeding augers 112 to supply seed to feed shoots 110 and a cover lid 116 to protect the seed.

In one embodiment, following the seed planting system is an optional packer wheel 111 to tighten and texture the soil surface for other soil benefits and purposes. The packer wheel 111 has the ability to also be used as a height/angle adjusting mechanism for the soil tillage apparatus.

The packer wheel 111 may be attached to the sub-frame 36 by means of connecting plate 118 and pivot mechanism/bearing 136 which is connected through pivot pin/shaft assembly 138 to side members 120. The side members 120 contain a bearing assembly 60 that holds the packer wheel drum shaft 124. On the packer wheel drum shaft 124 there are a variety of soil texturing additions (e.g., protrusions) 126. Between the two side members 120 there is a cross-member 50 that connects the opposite sides together. The adjustable height assembly is raised and lowered by an adjustable mechanism 170 which is attached on upper end to other main frame rear cross-member 46 by connecting plates 30 and connecting pin 26, and on the lower end is attached to cross-member 50 by the means of connecting plates 122 and connecting pins 26.

In one embodiment, as generally illustrated in FIGS. 1 and 2, a soil tillage apparatus 101 comprises a main frame 28 having an earth cutter 103, a hammer tiller 105, chiselers 107, a soil leveler 109, and a packer wheel 111 all in a linear arrangement. The earth cutter 103 comprises a plurality of discs 52 and is positioned at the front of the main frame 28, proximal to a tractor, truck, or other pulling means. The hammer tiller 105 is positioned behind the earth cutter 103 and comprises a rotary drum shaft 62 having one or more hammer tines 70 attached thereto for pulverizing soil received from the earth cutter 103. The chiselers 107 are positioned next and dig deep into the soil that is not passed above by the hammer tiller 105. The soil leveler 109 comprises a rotary drum shaft 100 with a plurality of protrusions 102 for leveling the soil. The packer wheel 111 likewise comprises a rotary drum shaft 124 with a plurality of protrusions 126 which may be used for leveling purposes or for seed bed furrowing, depending upon the arrangement.

Figure 4:
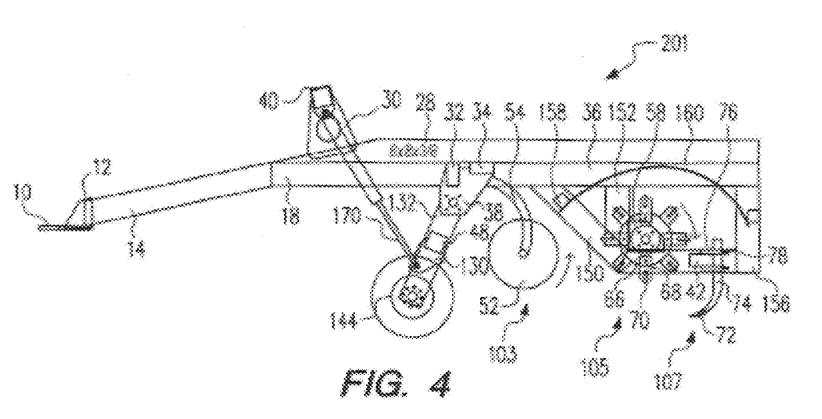
FIG. 4 is a side elevation view of soil tillage apparatus.
Figure 5:
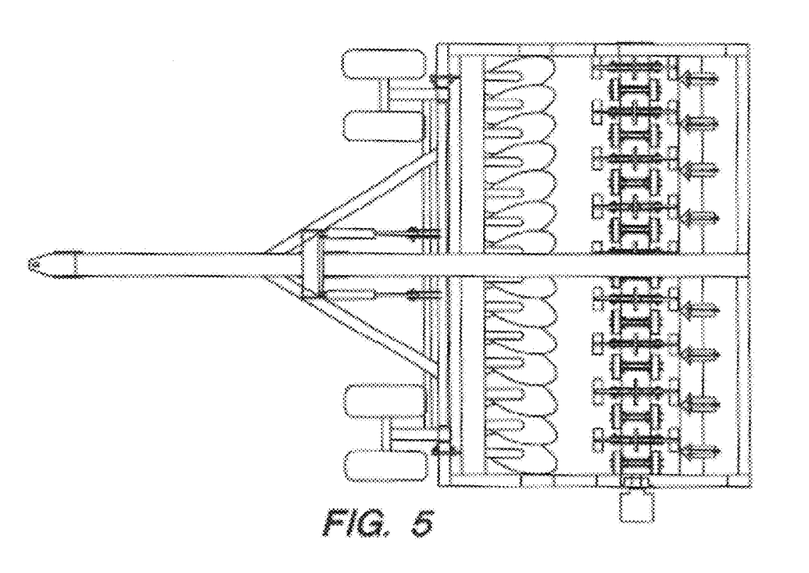
FIG. 5 is a top plan view of a soil tillage apparatus.
Figure 6:
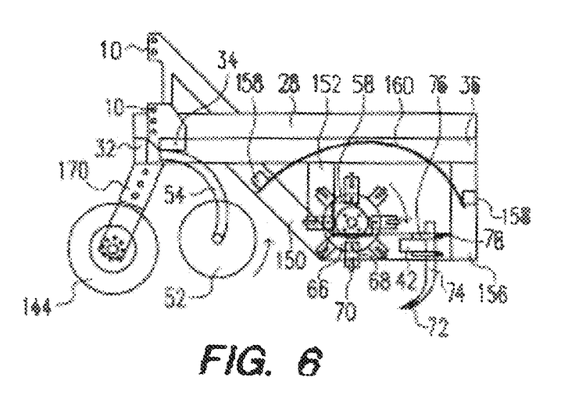
FIG. 6 is a side elevation view of a soil tillage apparatus with a three-point hitch.
Figure 7:
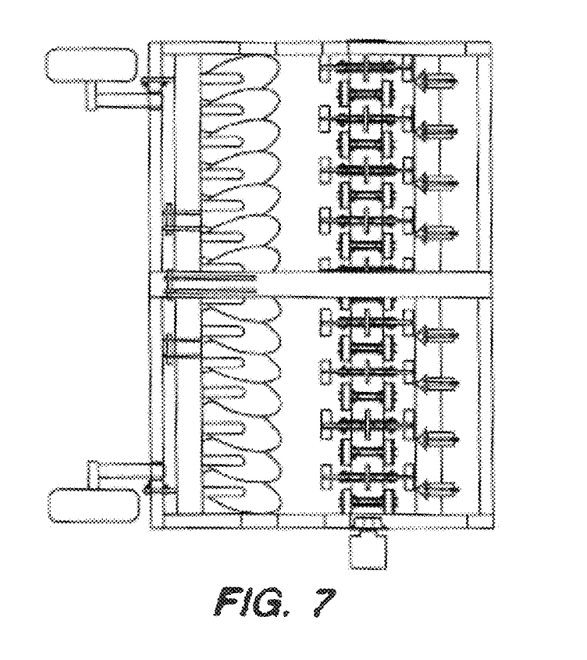
FIG. 7 is a top plan view of a soil tillage apparatus with a three-point hitch.

In another embodiment, as generally shown in FIGS. 4-7, a soil tillage apparatus 201 comprises a frame 28 having an earth cutter 103, a hammer tiller 105, and chiselers 107. In FIGS. 4-5, the tractor connecting means is a tongue 14 and in FIGS. 6-7, the tractor connecting means is a three-point hitch. Other mechanism may be used as well, such as rotary leveler and packer wheel, but are not required.

Figure 8:
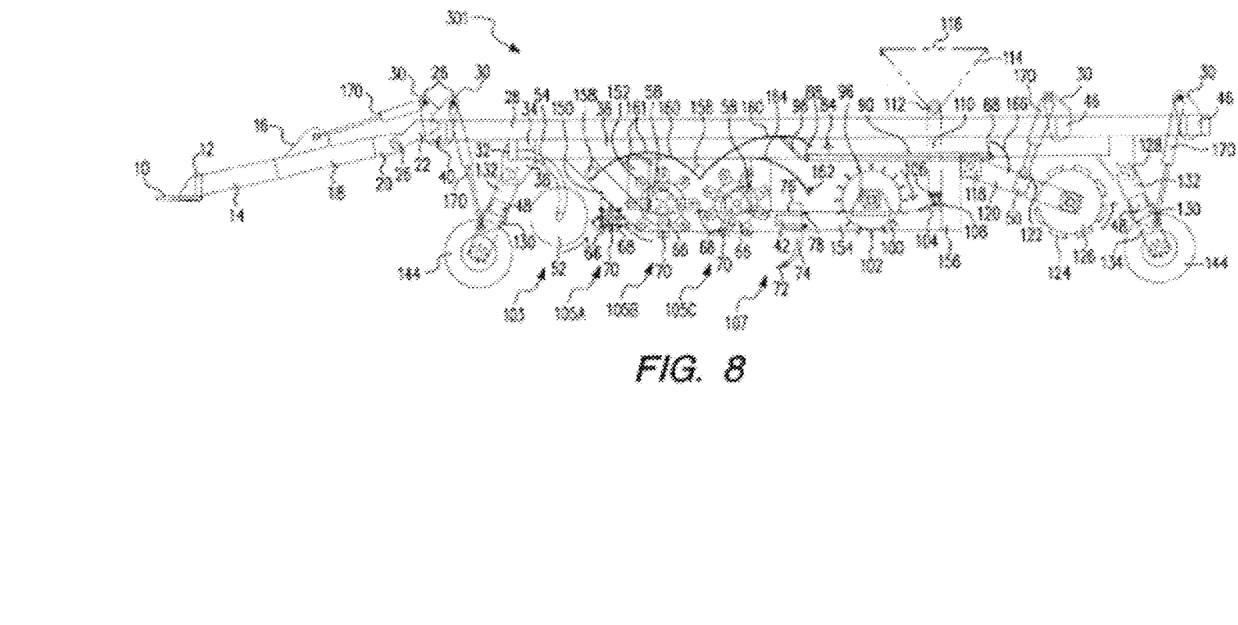
FIG. 8 is a side elevation view of a soil tillage apparatus having more than one hammer tiller.
Figure 9:
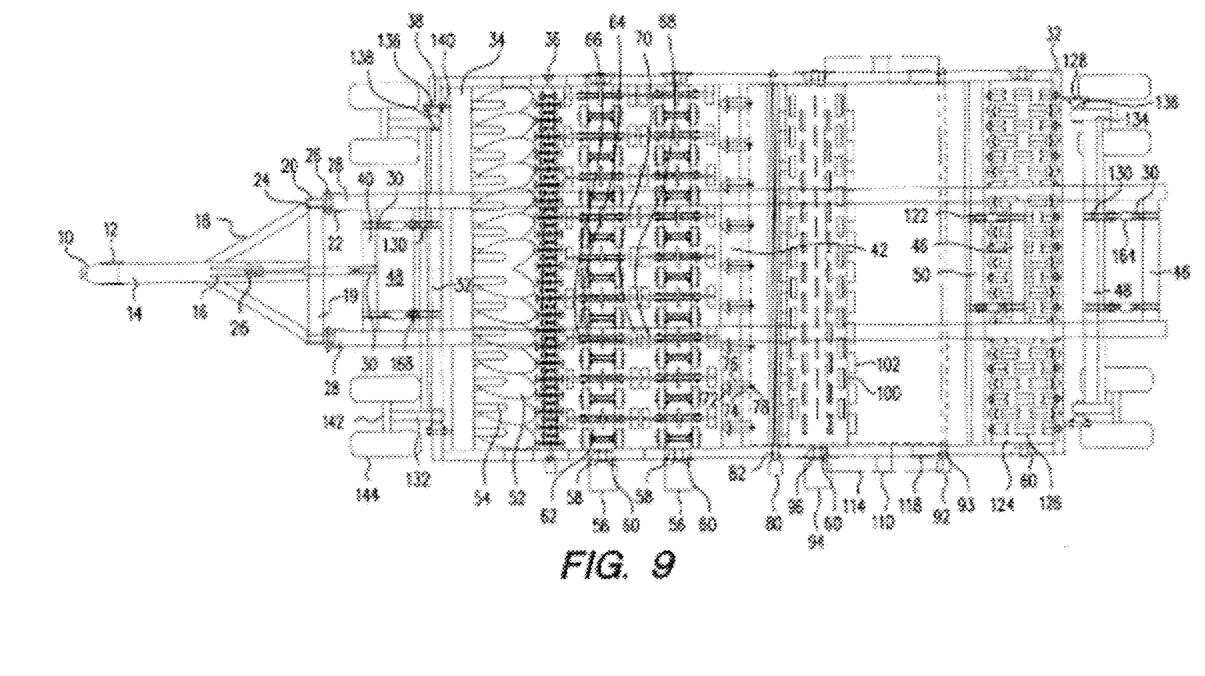
FIG. 9 is a top plan view of a soil tillage apparatus having more than one hammer tiller.

In yet another embodiment, as generally illustrated in FIGS. 8-9, a soil tillage apparatus 101 comprises a frame 28 having an earth cutter 103, a plurality of hammer tillers 105A-C, and chiselers 107. As shown, the hammer tillers 105A-C may be two successive assemblies, allowing easier pulverization of rough terrain. Each hammer tiller 105A-C may have an independent motor 56, allowing for varying speeds between them. Likewise, the hammer tillers 105A-C may rotate in the same or opposite directions. As noted, the hammer tillers 105A-305C need not be the same size, and may be placed in varying locations to achieve the needs of a user.

What is claimed is:

1. A soil tillage apparatus, comprising a frame; a hitch means for mounting to a front end of said frame for coupling to a vehicle arranged to pull said frame; an earth cutter comprising a plurality of discs that are journaled across said frame and proximate to said front of said frame and are angled outwardly from the direction of travel of said frame; a hammer tiller positioned behind said earth cutter and includes transmission means for controlling speed of turning of said hammer tiller oppositely to the direction of turning of said plurality of discs and is suspended to turn above the ground in the path of the soil lifted by said plurality of discs, comprising a rotary drum having at least one pulverizer attached by a pivot coupling to said rotary drum to extend outwardly from said turning rotary drum to flail the soil lifted by said plurality of discs, pulverizing the soil lifted by said plurality of discs from said earth cutter; and chiselers rigidly mounted across said frame and behind said hammer tiller for digging deep into the soil that is not passed above said hammer tiller.

2. The soil tillage apparatus of claim 1, further including a packer wheel comprising a rotary drum that includes a plurality of protrusions extending outwardly a short distance from said rotary drum surface for leveling the soil.

3. The soil tillage apparatus of claim 1, further including a packer wheel comprising a rotary drum journaled in said frame having an outer cylindrical surface that includes a plurality of protrusions for contacting the ground when said rotary drum is turned, leveling said ground or for seed bed furrowing.

4. The soil tillage apparatus of claim 2 further comprising a conveyor belt positioned above the packer wheel.

5. A soil tillage apparatus of claim 1, further including the earth cutter comprising a plurality of discs that are positioned at the front of the frame; a plurality of hammer tillers that are each aligned with each said disc and are positioned higher than said earth cutter discs; and the plurality of chiselers are positioned behind said plurality of hammer tillers.

6. The soil tillage apparatus of claim 1, wherein each hammer tiller pulverizer includes a tine that is connected by a single pin to swing across an outer surface of the rotary drum to impact, in mid air, the soil material lifted by the rotating disks, braking up clods of said soil material that then falls to the ground.

7. The soil tillage apparatus of claim 6, wherein each hammer tiller pulverizer includes a rectangular blade whose face is secured to and across the tine outer end providing a flat surface that impacts the clods of soil material.

8. The soil tillage apparatus of claim 6, further including a cover shield fixed to the frame above the hammer tiller that has a concave curve formed therein and is fixed in place above said hammer tiller.

9. The soil tillage apparatus of claim, 8 further including an impact member fixed to the frame rearwardly from the cover shield and has a concave curve formed therein and is rearward from said hammer tiller.

* * * * *